United States Patent Office 2,776,302
Patented Jan. 1, 1957

2,776,302

STEROIDS AND THEIR PRODUCTION

Leopold Ruzicka, Zurich, and Andor Fuerst, Basel, Switzerland, assignors to Ciba Pharmaceutical Products, Inc., Summit, N. J.

No Drawing. Application August 11, 1953,
Serial No. 373,664

Claims priority, application Switzerland
September 18, 1952

11 Claims. (Cl. 260—397.1)

The present invention relates to the manufacture of 12α-sulfonic acid esters of 11β-hydroxy- and acyloxy-12α-hydroxy-steroids. It has been found that these compounds on hydrolysis yield 11:12β-oxides of the steroid series which can be readily converted into 11β-hydroxy-steroids having in the 12-position a substituent which may be readily removed by reduction; and also that the sulfonic acid ester group in the aforesaid sulfonic acid esters can be removed by reduction.

Accordingly, the present invention provides novel intermediates and processes which lead to the production in good yield of steroids unsubstituted in the 12-position but containing oxygen in the 11-position which constitute valuable medicaments useful for hormone therapy, or intermediate products for the manufacture thereof, e. g., cortisone.

Processes are known by which it is possible to prepare 11β-hydroxy-12α-halogen compounds, in particular 12α-bromo derivatives when using $\Delta^{11:12}$ unsaturated steroids as starting materials. However, these processes are unsatisfactory from the point of view of preparation and are therefore not suitable for commercial use.

The present invention also now renders it possible to obtain in good yield from 11:12α-oxides the 11:12β-oxides and from the latter the valuable steroids which are unsubstituted in 12-position and contain oxygen in 11-position. An essential step in these operations consists in the conversion of the 11β-acyloxy-12α-hydroxy-steroids into the 11:12β-oxides. The conversion is carried out by treating sulfonic acid esters of 11β-acyloxy-12α-hydroxy-steroids with hydrolysing agents whereupon the 11:12β-oxides are formed. The 11:12β-oxides can be split-up with the aid of acids, whereupon there is introduced an OH group in the 11-position and in the 12-position a group readily removed by reduction. When sulfonic acid esters of 12α-hydroxy-steroids having a free or esterified hydroxyl group in the 11-position are treated with reducing agents the sulfonic acid ester group is removed so as to produce the desired 12-unsubstituted steroids.

For the hydrolysis alkaline agents, such as alkali metal hydroxides, for example, potassium hydroxide, are especially suitable. For the splitting of 11:12β-oxides, inorganic or organic acids, such as for example, hydrogen chloride, para-toluene sulfonic acid or acetic acid, may be used. The removal by reduction of the sulfonic acid ester group in the 12-position is carried out especially advantageously by means of metal hydrides, such as sodium boron hydride or lithium aluminum hydride.

The sulfonic acid esters of 11β-acyloxy-12α-hydroxy-steroids are new and can be prepared by reacting 11β-acyloxy-12α-hydroxy-steroids with sulfonic acids, for example, aliphatic and aromatic sulfonic acids and/or their halides, such as the chloride. Preferably methane sulfonyl compounds are used, as for example, methane sulfonyl chloride. The acyl residue of the acyloxy group in 11-position may with advantage be a residue of a strong organic acid, such as a halogenated carboxylic acid, primarily the trichloracetyl residue. The 11β-acetoxy-12α-hydroxy-steroids are known. They are obtained when acetic acid is caused to react upon the 11:12α-oxides in the presence of a strong inorganic acid such as sulfuric acid. However, the yields in this process are poor.

According to a further feature of the present invention corresponding esters with strong organic acids are obtained in essentially higher yield when the specified 11:12α-oxides are reacted with strong organic acids, such as halogenated carboxylic acids, for example trichloracetic acid, trifluoro-acetic acid, or a sulfonic acid.

The specified steroids involved in the present invention belong to the cyclopentano-polyhydrophenanthrene or polyhydrochrysene series. Especial importance is attached to the derivatives of ergostane, cholestane, coprostane, sitostane, stigmastane, spirostane, cholane, allocholane, pregnane, allopregnane, androstane and testane. The starting materials can furthermore be substituted in the nucleus or in the side chain, for example in 3,5,6,17,20- and/or 21-position by free or functionally converted hydroxyl or oxo groups, such as acyloxy groups, for example acetoxy, propionyloxy or benzoyloxy groups, by alkoxy groups, for example methoxy or ethoxy groups, by acetalized oxo groups and also by free or functionally converted carboxyl groups, such as nitrile or esterified carboxyl groups or by a lactone group, for example butenolide group. The starting materials can have any configurations and may also contain double bonds, as for example in 5:6- or 22:23-position.

The following examples illustrate the invention, the relation between parts by weight and parts by volume being the same as that between the gram and the cubic centimeter:

*Example 1*

3.5 parts by weight of 3α:11β-diacetoxy-12α-hydroxy cholanic acid methyl ester are dissolved in 50 parts by volume of anhydrous pyridine and treated at 0° C. with 3 parts by volume of methane sulfonic acid chloride. After a few hours standing at room temperature, the reaction mixture is poured on ice, extracted with ether and the ethereal solution washed neutral, dried and evaporated. The crude 3α:11β-diacetoxy-12α-mesyloxy cholanic acid methyl ester obtained is now dissolved in 10 parts by volume of ether and introduced dropwise into the hot solution of 10 parts by weight of potassium hydroxide in 500 parts by volume of methanol. The reaction mixture is now boiled under reflux for 1½ hours, 350 parts by volume of methanol subsequently removed by distillation and after cooling, 95 percent of the caustic potash neutralized with dilute hydrochloric acid. The reaction solution is acidified by the addition of dilute acetic acid. After dilution with water, the whole is extracted with ether and the ethereal solution washed with water, dried and evaporated. From the crude 3α-hydroxy-11:12β-oxido-cholanic acid, the 3α-acetoxy-11:12β-oxido-cholanic acid methyl ester of melting point 150–152° C. is obtained in practicaly quantitative yield by esterification with diazo methane in ether solution followed by acetylation by acetic anhydride and pyridine.

1.5 parts by weight of 3α-acetoxy-11:12β-oxido-cholanic acid methyl ester are dissolved in 100 parts by volume of dioxane and treated at room temperature with 50 parts by volume of 2 N-hydrochloric acid. After 2 hours' standing, water is added, the whole is extracted with ether and the ethereal solution is washed, dried and evaporated. In this manner there is obtained in practically quantitative yield the 3α-acetoxy-11β-hydroxy-12α-chloro-cholanic acid methylester of melting point 190° C. which crystallizes from a mixture of ether and petroleum ether in fine needles. This compound may be reduced to 3α-acetoxy-11β-hydroxy-cholanic acid methyl ester as follows:

1.5 parts by weight of 3α-acetoxy-11β-hydroxy-12α-chloro-cholanic acid methyl ester are dissolved in 75 parts by volume of pure alcohol and agitated in an autoclave with 1 part by weight of Raney nickel at 120° C. in a hydrogen atmosphere (10 atmospheres gauge pressure) for 3 hours. After cooling the whole is filtered off from the catalyst and the filtrate evaporated. The residue is reacylated by treatment with an excess acetic anhydride in pyridine at room temperature. The resulting 3α-acetoxy-11β-hydroxy-cholanic acid methyl ester melts at 147° C. after recrystallization.

The chlorhydrin may be reduced with other catalysts such as palladium-calcium-carbonate.

The 3α-acetoxy-11β-hydroxy-12α-chloro-cholanic acid methyl ester can be converted, for example in the following manner, into the 3α-acetoxy-11-keto-cholanic acid methyl ester:

1 part by weight of 3α-acetoxy-11β-hydroxy-12α-chloro-cholanic acid methyl ester is dissolved in 50 parts by volume of glacial acetic acid and oxidized for 4 hours at room temperature with a solution of 1.1 equivalents of chromium trioxide in acetic acid. The unconsumed oxidizing agent is destroyed by addition of methanol, the reaction solution diluted with water and extracted with ether and the ether extract dried and evaporated. The crude 3α-acetoxy-11-keto-12α-chloro-cholanic acid methyl ester is dissolved in 30 parts by volume of glacial acetic acid and treated with 0.75 part by weight of zinc dust and boiled under reflux for one hour. After cooling, the reaction mixture is filtered, extracted with ether and the ether solution freed from glacial acetic acid by washing with dilute sodium carbonate solution and dried. After evaporation of the ether, the 3α-acetoxy-11-keto-cholanic acid methyl ester of melting point 131–132° C. is obtained in very good yield.

Example 2

1 part by weight of the 3α-acetoxy-11:12β-oxido-cholanic acid methyl ester described in Example 1 is dissolved in 50 parts by volume of anhydrous benzene, 1 part by weight of paratoluene sulfonic acid is added and the whole is allowed to stand for 24 hours at room temperature. The reaction mixture is then stirred into a dilute solution of sodium carbonate and extracted with benzene. The dried benzene solution is evaporated in vacuo; the residue is 3α-acetoxy-11β-hydroxy-12α-tosyloxy-cholanic acid methyl ester. The crude product is then dissolved in 50 parts by volume of dioxane and after adding 20 parts by volume of water the whole is boiled for 3 hours under reflux with 1.5 parts by weight of sodium boron hydride. To work up, the whole is acidified with dilute sulfuric acid and extracted with ether. After being washed with water the solvent is dried and evaporated. The residue is esterified with diazomethane in ether solution and reacetylated by being treated with an excess of acetic anhydride and pyridine at room temperature. In this manner there is obtained 3α-acetoxy-11β-hydroxy-cholanic acid methyl ester melting at 147° C.

Example 3

1 part by weight of 3α-acetoxy-11:12β-oxido-cholanic acid methyl ester is dissolved in 30 parts by volume of glacial acetic acid and heated for 2 hours on a water bath. After removing the acetic acid in vacuo, there remtains in the residue 3α:12α-diacetoxy-11β-hydroxy-cholanic acid methyl ester. By treating with acetic anhydride in a solution of pyridine there is obtained 3α:11β:12α-triacetoxy-cholanic acid methyl ester melting at 210° C.

Example 4

3.2 parts by weight of crude 3α-acetoxy-11β-trichloracetoxy-12-α-hydroxy-cholanic acid methyl ester are dissolved in 30 parts by volume of anhydrous pyridine, treated in the cold with 3 parts by volume of methane sulfonic acid chloride and allowed to stand for 20 hours at room temperature. The reaction mixture is now poured into ice water and extracted with ether. After thorough washing of the ethereal solution with water, dilute sodium carbonate solution and water, the ether extract is dried over sodium sulfate. The ethereal solution, which contains crude 3α-acetoxy-11β-trichloracetoxy-12α-mesyloxy-cholanic acid methyl ester, is now introduced dropwise into a boiling solution of 10 parts by weight of potassium hydroxide in 250 parts by volume of methanol and boiled under reflux for 90 minutes. The majority of the solvent is then distilled off and, after acidification with acetic acid, the residue extracted with ether and the ethereal solution washed, dried and evaporated. The crude product is now consecutively esterified with diazo methane in ether solution and acetylated by treatment with acetic anhydride in pyridine solution. In this manner 2.4 parts by weight are obtained of the 3α-acetoxy 11:12β-oxidocholanic acid methyl ester described in Example 1.

The 3α - acetoxy - 11β - trichloracetoxy - 12α - hydroxy-cholanic acid methyl ester used as starting material can be obtained in an advantageous manner as follows:

3 parts by weight of 3α - acetoxy - 11:12α - oxidocholanic acid methyl ester are dissolved in 25 parts by volume of toluene which contains 1.34 parts by weight of trichloracetic acid and left to stand for 22 hours at room temperature. Then the reaction mixture is stirred into dilute sodium carbonate solution and extracted with ether. The dried ethereal solution is now carefully evaporated under reduced pressure. The residue is crude 3α - acetoxy - 11β - trichloracetoxy - 12α - hydroxy - cholanic acid methyl ester.

Example 5

2 parts by weight of 3α-acetoxy-11β-trichloracetoxy-12α-mesyloxy-cholanic acid methyl ester described in Example 4 are dissolved in 50 parts by volume of anhydrous tetrahydrofurane, 1.5 parts by weight of lithium aluminum hydride are added and the whole boiled for 5 hours under reflux. After cooling the reducing agent is destroyed by the addition of water and the reaction product extracted with ether. The solvents are washed with dilute sulfuric acid and water, dried and evaporated and there is obtained the crude 3α:11β:24-trihydroxy-cholane melting at 152–156° C.

What we claim is:

1. 3α:11β-diacetoxy-12α-mesyloxy-cholanic acid methyl ester.

2. 3α - acetoxy - 11β - trichloroacetoxy - 12α - mesyloxy-cholanic acid methyl ester.

3. A process which comprises reacting an 11β-acyloxy-12α-hydroxy-cholanic acid ester with a sulfonic acid compound to produce the corresponding 12α-sulfonic acid ester.

4. A process which comprises reacting an 11β-trihaloacetoxy-12α-hydroxy-cholanic acid ester with a sulfonic acid compound to produce the corresponding 12α-sulfonic acid ester.

5. A process which comprises reacting an 11β-trichloroacetoxy-12α-hydroxy-cholanic acid ester with a sulfonic acid compound to produce the corresponding 12α-sulfonic acid ester.

6. 11β-acyloxy-12α-sulfonyloxy-cholanic acid alkyl esters wherein the acyloxy radical is a member selected from the group consisting of lower aliphatic hydrocarbon carbonyloxy and halogenated lower hydrocarbon carbonyloxy radicals and the sulfonyloxy radical is a member of the group consisting of lower aliphatic sulfonyloxy and monocyclic carbocyclic aromatic sulfonyloxy radicals.

7. 11β-acyloxy-12α-sulfonyloxy-cholanic acid methyl esters wherein the acyloxy radical is a member selected from the group consisting of lower aliphatic hydrocarbon carbonyloxy and halogenated lower hydrocarbon carbonyloxy radicals and the sulfonyloxy radical is a member of the group consisting of lower aliphatic sulfonyloxy and monocyclic carbocyclic aromatic sulfonyloxy radicals.

8. 11β - acetoxy - 12α - sulfonyloxy - cholanic acid alkyl esters wherein the sulfonyloxy radical is a member of the group consisting of lower aliphatic sulfonyloxy and monocyclic carbocyclic aromatic sulfonyloxy radicals.

9. 11β - trihaloacetoxy - 12α - sulfonyloxy - cholanic acid alkyl esters wherein the sulfonyloxy radical is a member of the group consisting of lower aliphatic sulfonyloxy and monocyclic carbocyclic aromatic sulfonyloxy radicals.

10. 11β - trichloroacetoxy - 12α - sulfonyloxy - cholanic acid alkyl esters wherein the sulfonyloxy radical is a member of the group consisting of lower aliphatic sulfonyloxy and monocyclic carbocyclic aromatic sulfonyloxy radicals.

11. 11β - trichloroacetoxy - 12α - mesyloxy - cholanic acid alkyl esters.

References Cited in the file of this patent

UNITED STATES PATENTS

| | | |
|---|---|---|
| 2,401,775 | Reichstein | June 11, 1946 |
| 2,495,735 | Kendall | Jan. 31, 1950 |
| 2,590,637 | Miescher | Mar. 25, 1952 |
| 2,655,500 | Marlatt | Oct. 13, 1953 |
| 2,656,348 | Miescher | Oct. 20, 1953 |
| 2,656,365 | Miescher | Oct. 20, 1953 |